United States Patent [19]

Asperger et al.

[11] 4,100,099

[45] Jul. 11, 1978

[54] QUATERNARY SALT-POLYAMINE INHIBITOR FOR SOUR GAS CONDITIONING SOLUTIONS

[75] Inventors: Robert G. Asperger; Robert C. Clouse, both of Midland, Mich.

[73] Assignee: The Dow Chemical Company, Midland, Mich.

[21] Appl. No.: 782,159

[22] Filed: Mar. 28, 1977

[51] Int. Cl.² .............................................. C09K 3/00
[52] U.S. Cl. ................................... 252/189; 252/389 R; 252/390; 252/392; 423/228; 423/229
[58] Field of Search ........... 252/390, 391, 392, 389 R, 252/189; 21/2.7 R; 423/228, 229

[56] References Cited

U.S. PATENT DOCUMENTS

| | | | |
|---|---|---|---|
| 3,790,496 | 2/1974 | Hausle et al. | 252/392 |
| 3,992,313 | 11/1976 | Anderson et al. | 252/392 |

*Primary Examiner*—Benjamin R. Padgett
*Assistant Examiner*—J. L. Barr
*Attorney, Agent, or Firm*—Glwynn R. Baker

[57] ABSTRACT

The corrosion of iron and steel by an aqueous sour gas conditioning solution used to remove $CO_2$ and $H_2S$ from a gas stream is effectively inhibited by a combination of a quaternary pyridinium salt and a lower alkylenepolyamine or corresponding polyalkylenepolyamine.

11 Claims, No Drawings

QUATERNARY SALT-POLYAMINE INHIBITOR FOR SOUR GAS CONDITIONING SOLUTIONS

BACKGROUND OF THE INVENTION

The present invention relates to a new inhibitor composition useful for preventing corrosion by solvents used in treating sour gas streams and to the inhibited solvent.

The conditioning of naturally occurring and synthetic gases by absorbing acidic gases such as $CO_2$, $H_2S$, COS, and HCN in an absorbent solution has been practiced commercially for many years. Gases such as feed gas for an ammonia plant, natural gas, and flue gas are examples. Aqueous solutions of various compounds such as alkanolamines, sulfolane (tetrahydrothiophene-1,1-dioxide), potassum carbonate, and mixtures of two or more of these have been used for the purpose. The water may be replaced in part or in whole by a glycol. All of these systems are plagued by corrosion of metal equipment which can be caused by products of degradation of the absorbent, by acidic components, or by products of reaction of these acidic components with the absorbent. For example, although aqueous alkanolamine itself is not particularly corrosive toward iron and steel equipment, it becomes highly corrosive when there are dissolved sour gases present, particularly when it is hot. To combat this problem, various metal compounds have been used alone or in combination with other compounds as corrosion inhibitors, for example, compounds of arsenic, antimony, and vanadium. While such metal compounds are effective inhibitors of $CO_2$-promoted corrosion, they are ineffective when $H_2S$ is present. These metal compound inhibitors also have the disadvantages of low solubility in most gas conditioning solutions and of relatively high toxicity. The latter property is particularly undesirable since it affects both the handling of the solvent and the disposal of waste material.

An organic inhibitor system for inhibiting corrosion of ferrous metals by sour gas conditioning solutions used primarily to remove $CO_2$ which comprises the combination of a quaternary pyridinium salt and a thio compound which is a water-soluble sulfide, thiocyanate, or an organic thioamide in a weight proportion of one part of pyridinium salt to about 0.001-10 parts of thio compound is described in our concurrently filed application S. N. 782,156 entitled Inhibitor for Gas Conditioning Solution. However, this organic inhibitor combination is less effective when the sour gas contains substantial amounts of $H_2S$ as well as $CO_2$.

SUMMARY OF THE INVENTION

It has now been found that corrosion of iron and steel caused by a sour gas conditioning solution containing both $H_2S$ and $CO_2$ is effectively inhibited by a small but inhibiting amount of the combination of a quaternary pyridinium salt as described in the above-noted concurrently filed application with a lower alkylene polyamine or corresponding polyalkylenepolyamine, lower alkylene being defined as ethylene or propylene. Preferably this combination contains about 0.01-10 parts by weight of polyamine to one part of quaternary salt.

DETAILED DESCRIPTION

The polyamine component includes ethylenediamine, propylene diamine, the various polymeric forms of these such as tetraethylenepentamine, hexaethyleneheptamine, tripropylenetetramine, dipropylenetriamine, the higher molecular weight compounds of the same type and also the closely related polymers of ethylenimine and propylenimine as well as mixtures of any of these including polyalkylene polyamines containing mixed ethylene and propylene groups. These straight chain and branched chain polyamines can have molecular weights running as high as several hundred thousand. The term polyalkylenepolyamine is used herein to mean all of these polymeric forms and mixtures thereof. Polyethylenepolyamines are preferred, particularly those having an average molecular weight of about 100-1000.

Essentially any pyridinium salt which is stable in the gas conditioning solution is operable in the invention. Preferably, this salt has the formula:

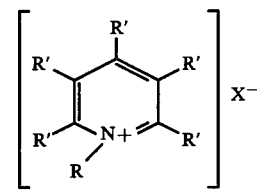

where R is an alkyl radical of 1-20 carbon atoms, a benzyl radical, or an alkylated benzyl radical wherein the aromatic ring has one or more alkyl substituents totaling 1-20 carbon atoms, each R' is a hydrogen atom or an alkyl radical of 1-6 carbon atoms, and X is any convenient anionic radical such as halide, sulfate, acetate, or nitrate. In the above general formula, X is preferably a bromine or chlorine atom and best results are obtained when X is bromine. Best results are also obtained when at least one R' represents an alkyl radical and particularly good inhibition has been found when the pyridine ring has multiple alkyl substituents. Preferably, R is a higher alkyl radical of about 10-18 carbon atoms.

While any significant quantity of the inhibitor combination will provide some degree of inhibition of corrosion, at least about 100 parts per million concentration of the combination in the gas conditioning solution is usually required to provide practical protection. Either the polyamine or the pyridinium salt alone will provide no inhibition or only partial inhibition. It appears that relatively little of the polyamine is usually needed in the presence of the pyridinium salt, however, concentrations as low as 50 parts per million of polyamine in the presence of 50-100 parts per million of pyridinium salt having been found to give effective inhibition in some cases. About the maximum degree of inhibition obtainable with a particular combination is usually found when the concentration of the polyamine reaches a concentration of 50-500 parts per million. Higher concentrations of this component appear to offer little or no added benefit.

On the other hand, it has been found that at least about 50 parts per million and preferably 100-1000 parts of the pyridinium salt is required to obtain optimum results. For each combination, a maximum degree of inhibition seems to occur at a particular level within the preferred ranges described above and higher concentrations of either component or of the combined components provide slight added protection, if any. In many cases, higher concentrations seem to cause a slight decline in the degree of inhibition after a maximum has been reached.

The present invention affords effective inhibition of iron and steel corrosion by sour gas conditioning solutions containing dissolved $CO_2$ and $H_2S$ using relatively low concentrations of an inhibitor combination which is easily handled and convenient to use. A concentrate of the combined compounds can be made up in aqueous solution such as aqueous alkanolamine, aqueous glycol, or alcohol and this concentrate is conveniently added to the gas treating solvent as required to make up or to maintain a desired concentration. Such a concentrate preferably contains about 0.01-10 parts of polyamine per part of quaternary pyridinium salt and a concentrate containing 0.1-1 part by weight of polyamine per part of salt is most preferred.

This inhibitor combination is particularly useful in aqueous lower alkanolamine solutions known as sour gas scrubbing solvents. Preferred lower alkanolamines can be defined as those having the formula:

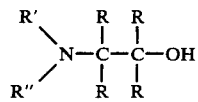

wherein R' and R" independently represent hydrogen or $-CR_2CR_2-OH$ and wherein each R may be hydrogen or an alkyl radical of 1-2 carbon atoms. Representative alkanolamines are ethanolamine, diethanolamine, triethanolamine, isopropanolamine, diisopropanolamine, and N-methyldiethanolamine. Related alkanolamines which are useful acidic gas absorbents are Methicol (3-dimethylamino-1,2-propanediol) and diglycolamine (2-(2-aminoethoxy)ethanol). Other gas-treating absorbents in which this inhibitor combination is effective include sulfolane (tetrahydrothiophene-1,1-dioxide) and aqueous potassium carbonate. These absorbents can be employed alone or in combinations of two or more, usually in aqueous solution although the water may be replaced in part or wholly by a glycol.

Testing Procedure

The corrosion of mild steel by aqueous alkanolamine solutions saturated with $CO_2$ for 7 hours at 10°-20° C and containing an $H_2S$ equivalent as noted was measured at elevated temperatures and moderate pressure. Loosely capped bottles each containing 120 ml of test solution and a totally immersed 1 × 2.5 × 0.0625 inch coupon of 1020 mild steel were put in a modified pressure filter for a period of 16-18 hours, at 125° C and 40 psig unless otherwise specified. The test solvent was 30% aqueous ethanolamine unless otherwise specified. The steel coupons were previously cleaned with 5N HCl by immersion for 30 minutes at room temperature, followed by a soap and water wash, a water rinse, then an acetone rinse and air drying. At least two bottles of each trial solution were tested in each experiment along with three bottles of solution containing no inhibitor which served as controls. After testing, the same cleaning procedure was used except that the HCl treatment was for 15 minutes with 5N HCl inhibited with Dowell A-120, a commercial HCl inhibitor (Dowell Division of The Dow Chemical Company), in order to remove any corrosion deposits. The corrosion rate and efficiency of inhibition were calculated according to the following formulas using the average weight loss of the test coupons:

$$\text{Rate (mils/yr)} = \frac{534 \times \text{mgs weight loss of coupon}}{(\text{coupon density, g/cc})(\text{coupon surface, sq in})(\text{hrs})}$$

$$\% \text{ Inhibition} = \frac{\text{Corrosion rate of blanks} - \text{rate of test coupons}}{\text{corrosion rate of blanks}} \times 100$$

Preparation of Quaternary Salts

The quaternary pyridinium salts used in the inhibitor compositions were made by heating a mixture of the pyridine compound with excess alkyl halide or benzyl halide at 90° C for 2 hours. The reaction mixture was then cooled and the quaternary salt was recovered as a solid or viscous liquid precipitate.

Addition of $H_2S$ Equivalent

In the following examples, the $H_2S$ was added to the $CO_2$-saturated aqueous alkanolamines as an amount of aqueous $(NH_4)_2S$ sufficient to supply sulfide and hydrosulfide ions in about the same concentrations as the listed $H_2S$ concentration would provide. In Examples 1-3, the corrosion inhibition testing was done at 125° C in 30 percent aqueous ethanolamine saturated with $CO_2$ and containing the equivalent of 100 ppm, 300 ppm, and 500 ppm $H_2S$ as $(NH_4)_2S$, respectively.

EXAMPLE 1

| Quat. Salt | Polyamine | (100 ppm $H_2S$) Concentration, ppm | | % Inhibition |
|---|---|---|---|---|
| | | Quat. Salt | Polyamine | |
| TAPB[1] | PEI-3[2] | 100 | — | 76.5 |
| | | 500 | — | 94.2 |
| | | — | 100 | 64.3 |
| | | — | 500 | 49.1 |
| | | 100 | 100 | 94.3 |
| | | 500 | 100 | 95.5 |
| | | 100 | 500 | 94.2 |
| TAPB[1] | E-100[3] | — | 100 | 47.5 |
| | | — | 500 | 57.7 |
| | | 100 | 100 | 94.9 |
| | | 500 | 100 | 95.2 |

[1]TAPB = Tetradecyl bromide salt of polyalkylpyridines in lower alkylated pyridine still bottoms (HAP) sold by Reilly Tar and Chemical Corp. These still bottoms were from processes for making various lower alkyl substituted pyridines wherein most of the components were pyridines having multiple lower alkyl substituents, particularly methyl and ethyl groups.
[2]PEI-3 = Polyethylenimine of about 300 average molecular weight.
[3]E-100 = Ethylenediamine plant still bottoms containing 85-90% pentaethylenehexamine and hexaethyleneheptamine with some tetraethylenepentamine and small amounts of branched and cyclic isomers and derivatives.

EXAMPLE 2

| Quat. Salt | Polyamine | (300 ppm $H_2S$) Concentration, ppm | | % Inhibition |
|---|---|---|---|---|
| | | Quat. Salt | Polyamine | |
| TAPB | E-100 | 100 | — | 72.6 |
| | | 500 | — | 86.0 |
| | | 1000 | — | 83.7 |
| | | — | 100 | −4.6 |
| | | — | 500 | 10.1 |
| | | 100 | 100 | 90.8 |
| | | 500 | 100 | 88.7 |
| | | 100 | 500 | 90.1 |

EXAMPLE 3

| Quat. Salt | Polyamine | (500 ppm H₂S) Concentration, ppm | | % Inhibition |
|---|---|---|---|---|
| | | Quat. Salt | Polyamine | |
| TAPB | E-100 | 100 | — | 57.1 |
| | | 500 | — | 84.8 |
| | | 100 | 100 | 89.0 |
| | | 500 | 100 | 88.1 |
| | | 1000 | 100 | 86.4 |
| | | 500 | 500 | 91.3 |
| | | 1000 | 500 | 85.1 |
| | | 1000 | 1000 | 84.1 |

Examples 4-6 are essentially a repeat of Examples 1-3 using 60 percent aqueous diethanolamine as the ethanolamine solution. Equivalent amounts of aqueous (NH₄)₂S were added as before to the CO₂-saturated alkanolamine to provide about the concentrations of sulfide and hydrosulfide ions formed by the listed amounts of H₂S.

EXAMPLE 4

| Quat. Salt | Polyamine | (100 ppm H₂S) Concentration, ppm | | % Inhibition |
|---|---|---|---|---|
| | | Quat. Salt | Polyamine | |
| TAPB | E-100 | 100 | — | 92.8 |
| | | 500 | — | 93.6 |
| | | 1000 | — | 92.3 |
| | | — | 100 | 25.8 |
| | | — | 500 | 55.8 |
| | | 100 | 100 | 96.2 |
| | | 500 | 100 | 96.2 |

EXAMPLE 5

| Quat. Salt | Polyamine | (300 ppm H₂S) Concentration, ppm | | % Inhibition |
|---|---|---|---|---|
| | | Quat. Salt | Polyamine | |
| TAPB | E-100 | 100 | — | 88.6 |
| | | 500 | — | 90.3 |
| | | — | 100 | 49.1 |
| | | — | 500 | 60.2 |
| | | 100 | 100 | 93.2 |
| | | 500 | 100 | 91.8 |
| | | 100 | 500 | 92.6 |

EXAMPLE 6

| Quat. Salt | Polyamine | (500 ppm H₂S) Concentration, ppm | | % Inhibition |
|---|---|---|---|---|
| | | Quat. Salt | Polyamine | |
| TAPB | E-100 | 100 | — | 84.0 |
| | | 500 | — | 83.2 |
| | | 1000 | — | 84.0 |
| | | — | 100 | 39.6 |
| | | — | 500 | 46.3 |
| | | — | 1000 | 27.6 |
| | | 100 | 100 | 86.6 |
| | | 500 | 100 | 85.5 |

Similar effective inhibition of corrosion is found when the quaternary salt of the above examples is replaced by the same amount of other pyridinium salts as previously defined, for example, dodecylbenzyl 3-ethyl-4-methylpyridinium chloride, dodecyl alkylpyridinium bromide (made from HAP alkylpyridine still bottoms), tetradecyl 3-ethylpyridinium bromide, and tetradecyl trimethylpyridinium bromide. Similarly, closely comparable results are obtained when the polyamine component in these examples is replaced by the same concentration of polypropylenimine of 500 average molecular weight, triethylenetetramine, hexapropyleneheptamine, or other such polyamine as defined above.

In the same way, effective inhibition of ferrous metal corrosion is also obtained when these quaternary pyridinium salt-polyamine combinations are maintained at the disclosed concentration in other sour gas conditioning solutions such as previously described. For example, aqueous or glycol-containing solutions of diethanolamine, N-methyldiethanolamine, diisopropanolamine, and mixtures of these including mixtures with sulfolane and other known gas conditioning solvents, also aqueous potassium carbonate are all protected by these inhibitor combinations.

We claim:

1. A sour gas conditioning solution inhibited against CO₂ and H₂S promoted corrosion of iron and steel by having dissolved therein an inhibiting concentration of a combination of one part by weight of a quaternary pyridinium salt and about 0.01-10 parts of a lower alkylenepolyamine, a corresponding polyalkylenepolyamine, or a mixture thereof wherein the alkylene units contain 2-3 carbon atoms.

2. The inhibited solution of claim 1 wherein the pyridinium salt has the formula:

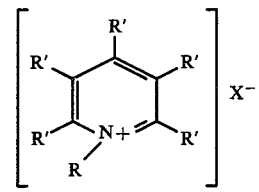

wherein R is an alkyl radical of 1-20 carbon atoms, a benzyl radical, or an alkylated benzyl radical wherein the aromatic ring has one or more alkyl substituents totaling 1-20 carbon atoms, each R' is a hydrogen atom or an alkyl radical of 1-6 carbon atoms, and X is an anionic radical and the polyamine is a polyethylenepolyamine having an average molecular weight of about 100-1000.

3. The inhibited solution of claim 2 wherein R in the pyridinium salt formula is an alkyl radical of 10-18 carbon atoms.

4. The inhibited solution of claim 3 wherein the pyridinium salt is tetradecyl polyalkylpyridinium bromide.

5. The inhibited solution of claim 1 wherein the sour gas conditioning solution is a solution of a lower alkanolamine, sulfolane, potassium carbonate, or mixture thereof in water, glycol, or a water-glycol mixture.

6. The inhibited solution of claim 5 wherein the solution is an aqueous lower alkanolamine.

7. The inhibited solution of claim 6 wherein the alkanolamine is ethanolamine.

8. The inhibited solution of claim 1 wherein the alkanolamine is diethanolamine.

9. The inhibited solution of claim 1 wherein the concentration of the inhibitor combination is at least about 100 parts per million by weight.

10. An inhibitor concentration consisting essentially of the pyridinium salt and the polyamine component of claim 1.

11. The inhibitor concentrate of claim 10 containing 0.1-1 part of polyamine per part of pyridinium salt.

* * * * *